(Model.)

C. W. WILFERT.
HAND PLANTER.

No. 266,939. Patented Oct. 31, 1882.

WITNESSES:
J. D. Garfield
C. Sedgwick

INVENTOR:
C. W. Wilfert
BY Munn & Co
ATTORNEYS.

UNITED STATES PATENT OFFICE.

CHARLES WILLIAM WILFERT, OF JEFFERSONVILLE, NEW YORK.

HAND-PLANTER.

SPECIFICATION forming part of Letters Patent No. 266,939, dated October 31, 1882.

Application filed May 29, 1882. (Model.)

*To all whom it may concern:*

Be it known that I, CHARLES WILLIAM WILFERT, of Jeffersonville, in the county of Sullivan and State of New York, have invented a new and useful Improvement in Hand-Planters, of which the following is a full, clear, and exact description.

Reference is to be had to the accompanying drawings, forming a part of this specification, in which similar letters of reference indicate corresponding parts in both the figures.

Figure 1:
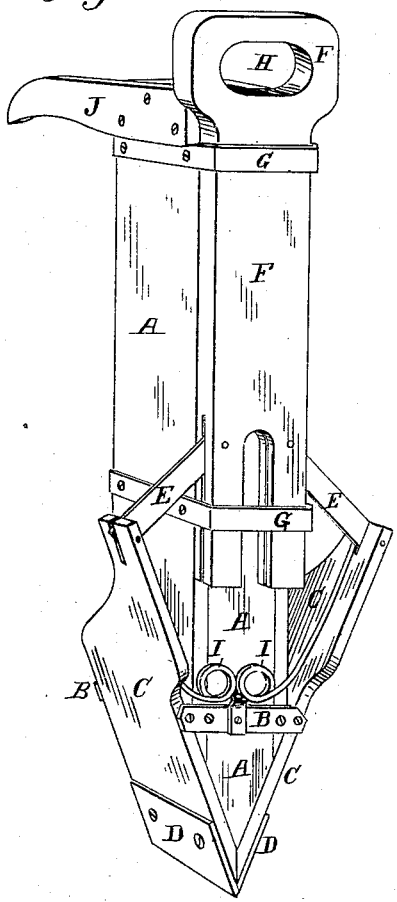
Figure 2:
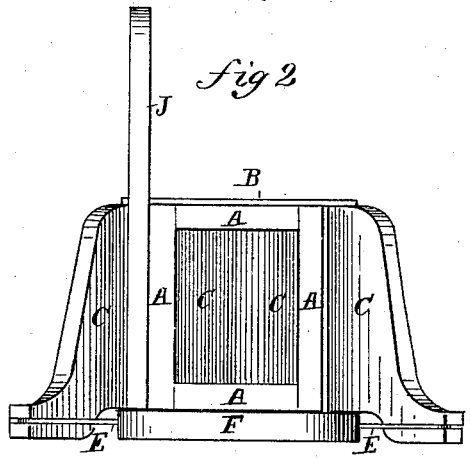

Figure 1 is a perspective view of my improvement. Fig. 2 is a plan view of the same.

The object of this invention is to facilitate the planting of potatoes and other seeds.

The invention consists in a hand-planter constructed with a box having its lower end beveled upon the opposite sides, and provided with a handle and guide-keepers. At the lower ends of the sides of the box are hinged two plates, connected at their upper ends by hinged bars with a slide placed at the forward side of the box. The upper ends of the hinged plates are held apart, holding their lower ends together by springs attached to the box, as will be hereinafter fully described.

I will describe my improvement as applied to a potato-planter; but I do not limit myself to that application, as it can be used with advantage for planting corn and other seeds.

A is the body or box of the planter, which is made rectangular in form, and is beveled upon the opposite sides of its lower end to an acute angle.

To the front and rear sides of the box A, at the base of the bevels, are attached metal straps B, the ends of which project, and to and between the said projecting ends are hinged two plates, C. The plates C fit against the beveled lower ends of the sides of the box A, and have the inner sides of their lower edges beveled to fit against each other, as shown in Fig. 1. The outer sides of the lower ends of the plates C are faced with metal plates D to prevent them from being worn by contact with the ground. The upper rear corners of the plates C are cut away to decrease the weight, and to their upper forward corners are hinged the lower ends of two connecting-bars, E. The upper ends of the bars E are hinged in and to the side edges of the lower part of the plate F, which is placed upon the forward side of the box A, and slides in keepers G, attached to the said box. The upper end of the plate F rises above the upper end of the box A, and has a hand-hole, H, formed in it for convenience in operating it. The upper ends of the plates C are held apart and their lower ends are pressed together by springs I, attached to the lower part of the forward side of the box A, with their free ends resting against the inner sides of the upper ends of the said plates C.

To the side of the upper end of the box A is attached a bar, J, which projects to the rearward, and serves as a handle in carrying the planter.

In using the planter the operator carries the potatoes in a bag suspended from his shoulder, in the same manner as in hand-planting, and with his left hand grasps the handle J. The operator then drops a potato with his right hand into the box A, and then, taking hold of the upper end of the slide F with his right hand, he forces the angular lower end of the planter into the ground to the required depth, and then raises the slide F with his right hand, while he holds the planter down with his left hand. The upward movement of the slide F forces the lower ends of the plates C apart, and thus opens a space in the ground, into which the potato drops, and is covered by the falling in of the soil as the planter is raised from the ground. While the operator is carrying the planter with his left hand to the place for the next hill, he drops another potato with his right hand into the box A, ready to be planted in the manner hereinbefore described. The machine can be used in the same manner for planting corn and other seeds.

Having thus described my invention, I claim as new and desire to secure by Letters Patent—

1. A hand-planter constructed substantially as herein shown and described, and consisting of the box A, having its lower end beveled upon the opposite sides, the hinged plates C, the hinged connecting-bars E, the slide F, and the springs I, as set forth.

2. In a hand-planter, the combination, with the box A, having its lower end beveled upon the opposite sides, and provided with the handle J and keepers G, of the the hinged plates C, the hinged connecting-bars E, the slide F, and the springs I, substantially as herein shown and described, whereby the seed can be readily planted at any desired depth.

CHAS. WM. WILFERT.

Witnesses:
WM. C. BRAND,
W. H. LIXFIELD.